United States Patent [19]

Nagashima et al.

[11] 4,371,550
[45] Feb. 1, 1983

[54] PROCESS FOR BREWING BEER

[75] Inventors: Yoshiaki Nagashima, Mitaka; Yoshiomi Kimura, Yokohama; Naoki Hashimoto, Takasaki, all of Japan

[73] Assignee: Kirin Beer Kabushiki Kaisha, Tokyo, Japan

[21] Appl. No.: 234,138

[22] Filed: Feb. 13, 1981

[30] Foreign Application Priority Data

Feb. 20, 1980 [JP] Japan ................... 55-19881

[51] Int. Cl.³ .................... C12C 9/00; C12C 11/04
[52] U.S. Cl. ............................ 426/16; 426/29
[58] Field of Search ............... 426/11, 13, 16, 29

[56] References Cited

U.S. PATENT DOCUMENTS 3,373,040 3/1968 Gluek ................... 426/16 X
4,038,420 7/1977 Pollock ................. 426/16
4,272,552 6/1981 Zastrom ............... 426/16 X

OTHER PUBLICATIONS

Hind, A. L., Brewing Science and Practice, vol. II, Chapman and Hall Ltd., London 1950 (pp. 834–849).

Primary Examiner—David M. Naff
Attorney, Agent, or Firm—Ladas & Parry

[57] ABSTRACT

Beer is brewed by a process which comprises mixing a high-gravity liquor comprising a fermenting wort of an original gravity of 14 to 21 degrees of plato after the high kraeusen period and a low-gravity liquor comprising a fermenting wort or wort of an original gravity of 3 to 6 degrees of plato and subjecting the resulting mixture to fermentation thereby to obtain a beer of an original gravity of 6 to 9 degrees of plato.

7 Claims, No Drawings

PROCESS FOR BREWING BEER

BACKGROUND OF THE INVENTION

This invention relates generally to a process for producing beer of low original gravity. More particularly, the invention relates to a process for producing beer of low original gravity without special elevation of the degree of attenuation.

In recent years, there has been a widespread popularization of brewed beverages called light beers, particularly in the United States of America. A light beer is characterized, in general, by a flavor which is lighter or fresher than that of a beer of an original gravity of wort of 10 to 12 degrees Plato (°P) (hereinafter referred to as "regular beer"), and its original gravity of wort is set lower than that of a regular beer in many cases. Since the calorific value of a beer may be considered to be determined by the original gravity of wort, although it increases or decreases somewhat depending on the degree of attenuation of the beer, a light beer of this character is, at the same time, a low-calorie beer whose calorific value is less than that of a regular beer.

In the prior art, the known processes for brewing beer of low original gravity of this character are broadly classified as follows:

(1) Those in which worts of gravities of 6 to 9 °P are fermented.
(2) Those in which saccharifying enzymes are used.
(3) Those in which fermentable sugars are used.
(4) Those in which dextrin assimilable yeasts are used.

Of these processes, process (1) does not differ from the traditional brewing process except for the use of a lower original gravity of wort, and a beer of low original gravity of a degree of attenuation not varying from that of a regular beer is brewed by this process. In process (2), amyloglucosidase, for example, is added to the wort at the time of fermentation thereby to convert the dextrin of the wort into sugars which brewers' yeast can assimilate. By this process (2), a beer of low original gravity of a degree of attenuation higher than that of a regular beer is brewed. Since the fermentable sugar content of the wort in process (3) is high, and also because even dextrin not assimilated by ordinary brewers' yeast is also assimilated in process (4), beers of low original gravity of degrees of attenuations higher than that of a regular beer are brewed by these processes.

In addition to these processes for brewing beers of low original gravity, the following processes wherein beers of low original gravity are obtained by diluting regular beers or beers of higher original gravities than regular beer are also possible.

(5) High-gravity brewing

This high-gravity brewing (5) is a process in which a wort for providing a beer of an original gravity higher than that of the desired beer to be produced is fermented, and thereafter the resulting beer is diluted with water to obtain the beer of the desired original gravity, as described in the BREWERS DIGEST, Vol. 51, p. 34 (1976). This technique appears to be spreading in the U.S.A. as a process for producing regular beer, probably because of its economical feature, and it is reported that, among the processes for producing beer of low original gravity in the U.S.A., there is a process in which, by diluting the beer of high original gravity with water, beer of an original gravity of 6 to 9 °P is obtained.

Furthermore, the following processes are known as techniques wherein two kinds of worts or beers are mixed.

(6) Adjunct fermentation process.
(7) Kraeusening process.
(8) Blending of worts (Darauflassen process).

The adjunct fermentation process (6) is a technique in which a sugar solution prepared from an adjunct is caused by a yeast to ferment thereby to form an alcohol solution, which is mixed with an all-malt beer thereby to obtain a beer of a desired original gravity of wort. Reference is made to MBAA TECHNICAL QUARTERLY, Vol. 13, p. 22 (1976).

In addition to these processes, there is a process disclosed in Japanese Patent Laid Open Publn. No. 54591/1974, which also should perhaps fall within the category of an adjunct fermentation process since it relates to the proposal of the proposer of the adjunct fermentation process.

The kraeusening process (7) is a technique for promoting secondary fermentation by replenishing yeast having vitality. The darauflassen process (8) is also a common technique used for purposes such as promotion of the primary fermentation and homogenization of the fermenting wort.

Another common technique is the procedure of blending in which worts or beer produced from the same process are mixed for the purpose of homogenization.

While a great number of various processes relating to the production of beer of low original gravity have been proposed or suggested in this manner, none have been completely satisfactory to the best of our knowledge and belief. The principal difficulties and problems accompanying these processes in the prior art are as follows.

In the first place, the product called light beer is not a beer developed in order to establish a new kind of beverage but is one intended to be a low-calorie beer to which a lightness or freshness has been imparted without spoiling the flavor of regular beer. Beers of low original gravity which we experimentally produced in accordance with these known techniques, however, had flavors which were inferior to those of regular beers.

In general, organoleptic appeal to consumers of a food or a beverage depends on complicated factors. Furthermore, it is impossible to quantitatively express the appeal as a contribution of each of and as an aggregate of whole of these various factors, whereby evaluation of the appeal must unavoidably be determined on sensory or taste tests. In addition, it is frequently observed that the appeal as a whole varies as a result of a variation in only a certain single factor, and, moreover, it is impossible to predict how a variation in a certain factor will affect the appeal as a whole.

This uniqueness of organoleptic appeal of a food or a beverage was observed also during taste tests on beer of low original gravity which we experimentally produced. That is, as a result of introducing variations in the processes for producing regular beer as described hereinbefore, it was indicated that in each beer of low original gravity, "body" was deficient, and the flavor was poor, the organoleptic appeal being markedly inferior to that for a regular beer.

More specifically, while process (1) is a most fundamental process in that it is for brewing a beer low original gravity, merely using a wort of low gravity will result in a beer which is of disappointing flavor and cannot be said to be comparable to regular beer. In processes (2) and (3), as a result of the raising of the degree of attenuation by the use of a saccharifying enzyme and a fermentable sugar, the formation of aroma components such as ethanol, higher alcohols, and esters is promoted, whereby an augmentation of the bouquet or flavor of the resulting beer of low original gravity can be expected. However, we have found that, while beers of low original gravity obtained by these processes possess a remarkable characteristic resulting from higher degree of attenuation than those of regular beers, they have not been developed to a level where, as a result of the reinforcement of their bouquet or flavor, the inadequacy of their flavor has been amply made up for. In the case of process (2), furthermore, it is said that since the saccharifying enzyme is not inactivated by an ordinary heat treatment after bottling, it sometimes causes a deterioration of the bouquet or flavor of the resulting bottled beer.

In the case of process (4), we have found that the beer obtained thereby with the use of Saccharomyces diastaticus as a dextrin assimilable yeast possesses a bouquet or flavor different from that of a beer brewed with an ordinary brewers' yeast and is a beverage of markedly inferior organoleptic appeal and characteristics not found in beer.

In comparison with these processes which start with low-gravity worts, process (5), in which a wort for producing a beer of an original gravity higher than that of the desired beer to be produced is fermented and is thereafter diluted with water to obtain a beer of a specific original gravity appears to be a promising process for producing a beer of low original gravity of excellent flavor. The reason for this is that, since a large quantity of esters are formed in the fermenting wort (or wort fermented) of high-gravity wort according to this process, it can be expected that the drawbacks possessed by beer obtained by fermenting a low-gravity wort directly as it is will be compensated for.

However, when we experimentally produced a beer of low original gravity by fermenting a wort with a high original gravity of 15 °P or higher than thereafter diluting the fermented wort with water to a specific original gravity of wort, this beer, while exhibiting estery flavor imparted thereto, was found to cause the drinker to strongly taste the energy flavor, and was found to be a beer which had lost its flavor balance.

SUMMARY OF THE INVENTION

It is an object of this invention to solve the above described problems of the prior art and to provide a process for brewing a beer of low original gravity of a flavor comparable to that of a regular beer. We have found that this object and other objects of this invention can be achieved by mixing a fermenting wort of high original gravity with a fermenting wort or wort of low original gravity and subjecting the resulting mixture further to fermentation.

According to this invention in its broadest aspect, briefly summarized, there is provided a beer brewing process which comprises:

mixing a high-gravity liquor comprising a fermenting wort of an original gravity of 14 to 21 degrees of plato which has passed through the high kraeusen period and a low-gravity liquor comprising a fermenting wort or wort of an original gravity of 3 to 6 degrees of plato and subjecting the resulting mixture to fermentation thereby to obtain a beer of an original gravity of 6 to 9 degrees of Plato.

The beer brewing process of this invention as summarized above has the following features and characteristics.

This invention is characterized by the steps of mixing a high-gravity fermenting wort and a low-gravity wort or fermenting wort and subjecting the resulting mixture further to fermentation, and by fermenting a wort of an original gravity of 14 °P or higher, the beer of low original gravity thus formed is endowed with a rich ester flavor, and its inadequacy is compensated for. Thus, by the mixing of a low-gravity wort or a fermenting wort thereof and the subsequent fermentation, harmonization of flavor can be realized, whereby the brewing of a beer of low original gravity of excellent organoleptic appeal or consumer preference therefor has become possible.

The beer of low original gravity obtained by the process of this invention is not necessarily of a degree of attenuation which is higher than that of a regular beer, but the extract components remaining in the brewed beer harmonize well with the augmented ester component, which is useful for improving the organoleptic appeal of beer.

As mentioned hereinbefore, the degrees in which various factors contribute to the organoleptic appeal of a beer have a complicated interrelation. When this is considered, it may be said the obtaining of satisfactory results by the combination of the conditions specified by this invention was unexpected.

Furthermore, while this invention from its nature does not specify any limits on the mode of adding hops, it may be an ordinary practice to add hops (herein interpreted to be inclusive of hop extract) to each of the high-gravity liquor wort and the low-gravity liquor, and this addition of hops to the low-gravity liquor is advantageous from the standpoint of hop utilization. The reason for this is that, since the hop utilization rate at the time of wort boiling to which hops have been added increases with decreasing wort gravity, the hop utilization rate can be raised by increasing the quantity of hops added on the low-gravity liquor portion.

The nature, utility, and further features of this invention will be more clearly apparent from the following detailed description beginning with a consideration of general aspects of the invention and concluding with a number of specific examples of practice constituting preferred embodiments of the invention and reference examples.

DETAILED DESCRIPTION OF THE INVENTION

1. High-Gravity liquor: high-gravity fermenting wort

As "high gravity liquor", any conventional fermenting wort may be used, provided that its original gravity is 14 to 21 °P and that it has passed through the high kraeusen period, namely its high kraeusen period has been completed. The term "fermenting wort" means the wort which is on its fermentation course before the fermentation is completed.

The wort in this case may be one prepared from only malt or one prepared from malt in combination with an adjunct such as rice or starch and can be obtained by a conventional mashing process. The supplementing of fermentable sugars is undesirable. The quantity in which the adjunct is used is usually 0 to 50 percent, preferably 0 to 40 percent, by weight of the malt on the basis of the total of this high-gravity liquor and the low-gravity liquor (described hereinafter).

This fermenting wort must be that of an original gravity of 14 to 21 °P. We have found that when this original gravity of wort is less than 14 °P, an ample ester component cannot be produced. On the other hand, when 20 °P is exceeded, the formation of the ester component becomes excessive, and it becomes difficult to obtain a beer of low original gravity having the flavor as an regular beer. A preferred original gravity of wort is of the order of 16 to 20 °P.

This fermenting wort must be one in which its high kraeusen period has been completed.

Here, the term "high kraeusen period" means, in general, that period in which the fermentation is ocurring most vigorously, and the foam is rising to the highest level on the surface of the fermenting wort in the process. In terms of sugar consumption, this term means that period in which the sugar in the fermenting wort is rapidly consumed until the apparent gravity of the fermenting wort becomes a value of the order of 40 to 50 percent of the original gravity of wort.

This high-gravity fermenting wort can be one to which hops have been added. The quantity of hops added should be so selected that the content of isohumulones in the beer of low original gravity produced as a total with the quantity of hops added to the low-gravity liquor will be at a suitable level. The hopping can be carried out, for example, by the adding and boiling of hop cones or by the adding of isomerized hop extract after the mixing of the low-gravity liquor and the high-gravity liquor.

The high-gravity liquor used in this invention may be prepared from a mash which is different from or is the same as that from which the low-gravity liquor is to be produced. In a specific example of the former method wherein the mash is common to the high-gravity and low-gravity liquors, the two worts are respectively prepared from mashes of different charge quantities of the malt and/or of adjuncts. In a specific example of the latter method, the two worts are prepared from the filtrate obtained by filtration of a mash after mashing thereof, that is, a high-gravity liquor is obtained as the filtrate and a low-gravity liquor is obtained as a dilution of the filtrate. The washings of the cake produced during filtration in this case can be utilized as the dilution.

The original gravity of wort is expressed in Plato degrees, °P. The extract contents of the wort can be calculated as Plato degrees from the figures in the Plato table by determining the specific gravity of the wort.

2. Low-Gravity liquor: low-gravity wort or fermenting wort

The low-gravity wort or the fermenting wort which comprises the low-gravity liquor and is to be mixed with the above described high-gravity liquor must have an original gravity of 3 to 6 °P. We have found that when the original gravity of wort is less than 3 °P, the problems arising in the case of dilution with water in high-gravity brewing (known process (5)) may not be solved. On the other hand, when 6 °P is exceeded, the quantity of the high-gravity liquor to be mixed becomes small, and its effect of imparting rich flavor is diminished. A preferred original gravity of wort is 4 to 5 °P.

As "low gravity liquor", any conventional wort or its fermentation product (viz. fermenting wort) may be used, provided that its original gravity is that described above. The starting material or materials for this wort may be malt only or malt used in conjunction with an adjunct such as rice or starch.

The low-gravity liquor may be a fermenting wort which has passed through the high kraeusen period, a fermenting wort prior to completion of the high kraeusen period, or a wort prior to fermentation.

It is desirable that the low-gravity liquor has a total nitrogen content of at least 30 mg/100 g. and a formol nitrogen content of at least 9 mg/100 g. We have found that when the nitrogen content is less than this level, the normal fermentation of the low-gravity liquor itself and the normal fermentation after mixture with the high-gravity liquor are liable to be impaired.

The low-gravity liquor can be one which has been hopped. Since, as mentioned hereinbefore, the hop utilization increases with decrease in the wort gravity, it can be said that it is preferable to supply most of the content of the isohumulone desired to the beer of low original gravity from the hopped low-gravity liquor.

3. Fermentation after mixing and resulting beer of low original gravity

The high-gravity liquor and the low-gravity liquor as described above are mixed and further caused to undergo fermentation.

The mixing ratio of these two liquors is so determined that the original gravity of wort of the resulting beer will be 6 to 9 °P. In general, the ordinary procedure is to mix 2 to 5 parts by volume of the low-gravity liquor with respect to 1 part by volume of the high-gravity liquor.

The fermentation of the mixture of the liquors corresponds to the so-called secondary fermentation step in the case where the low-gravity liquor is a fermenting wort which has passed through the high kraeusen period. The term "secondary fermentation" as used herein means a maturation step, according to common usage. In this step, together with the fermentation which continues slowly, a desirable balancing of the various flavoring ingredients is expected. In the case where the low-gravity liquor is a wort or a fermenting wort which has passed through the high kraeusen period, the fermentation after mixing is a process in which the fermentation required of this low-gravity liquor is also carried out.

Except for the above noted points, the beer brewing process of this invention is essentially not different from an ordinary beer brewing process.

In order to indicate more fully the nature and utility of this invention, the following examples of practice thereof are set forth, it being understood that these examples are presented as illustrative only and are not intended to limit the scope of the invention.

EXAMPLE 1

With the use of 6,100 g. of malt, 1,200 g. of rice and 1,200 g. of starch (each being 20% of the malt) as adjuncts, and 42 liters (lit.) of water in the conventional process, 63 lit. of a hopped wort of 9 °P is obtained. Yeast is added to the wort, which is subjected to a primary fermentation at 12° C. for 8 days and a secondary fermentation for 1 month. The resulting process material is filtered.

EXAMPLE 2

With the use of 6,100 g. of malt, and 30 lit. of water in the conventional process, 51 lit. of a hopped wort of 9 °P is obtained. To the wort is added malt diastase in a quantity of 0.03 W/V %, after which yeast is added, and the wort is subjected to a primary fermentation at 12° C. for 8 days and a secondary fermentation for 2 months. The resulting process material is filtered.

EXAMPLE 3

With the use of 6,100 g. of malt and 30 lit. of water in the conventional process, 61 lit. of a hopped wort of 7.5 °P is obtained. With this wort, 1/5 of its quantity of a solution of fine granulated sugar of 7.5 °P is mixed. Yeast is thereafter added to the mixture, which is then subjected to a primary fermentation at 12° C. for 7 days and a secondary fermentation for 1 month. The resulting material is filtered.

EXAMPLE 4

To the hopped wort of 7.5 °P in Example 3, a dextrin assimilable yeast (Saccharomyces diaststicus) is added, and the wort is subjected to a primary fermentation at 12° C. for 8 days and a secondary fermentation for 1.5 months. The resulting process material is then filtered.

EXAMPLE 5

With the use of 6,100 g. of malt, 22 lit. of water in the conventional process, 16.5 lit. of a hopped wort of 21 °P is obtained. This wort is divided into two lots, which are then diluted to prepare worts respectively of 15 °P/15.8 lit. and 4 °P/27.5 lit. Yeast is added to each wort. Then the high-gravity liquor and the low-gravity liquor are subjected to a primary fermentation respectively at 14° C. for 6 days and 9° C. for 6 days. The two resulting materials are then mixed to obtain fermenting wort of an original gravity of 8 °P, which is caused to undergo a secondary fermentation of 1 month. The resulting material is then filtered.

EXAMPLE 6

With the use of 6,100 g. of malt, 1,500 g. of corn grits and 32 lit. of water in the conventional process, 26.5 lit. of a high-gravity wort of 18 °P is obtained. Yeast is added to the wort, which is then subjected to a primary fermentation at 14° C.

Separately, with the use of 15 lit. of water and 2,900 g. of malt in the conventional process, 73 lit. of a low-gravity wort of 3 °P is obtained. Yeast is added to the wort, which is then subjected to a primary fermentation at 9° C. for 8 days. With the high-gravity fermenting wort after the high kraeusen period of the sixth day of this primary fermentation, the low-gravity fermenting wort is mixed. This primary fermentation is continued for a further 2 days, after which a secondary fermentation is carried for 1 month. The resulting material is filtered to obtain a beer of an original gravity of wort of 7 °P.

Hops are added in quantities of 0.6 g./lit. to the high-gravity wort and 1.0 g./lit. to the low-gravity wort, and wort boiling was carried out, whereupon the isohumulone content of the beer after mixing was 20.1 mg./lit.

EXAMPLE 7

With the use of 6,100 g. of malt, 1,200 g. of rice, 1,200 g. of starch and 32 lit. of water in the conventional process, wort is obtained. The wort thus obtained is divided into two lots and diluted to obtain 19 lit. of a high-gravity hopped wort of 20 °P and 52.5 lit. of a low-gravity hopped wort of 5 °P, respectively. Yeast is added to each wort. The high-gravity wort and the low-gravity wort are then subjected to primary fermentations at 14° C. for 8 days and 9° C. for 8 days, respectively. These two worts are then mixed, and the mixture is subjected to a secondary fermentation for a further 1.5 months. The resulting material is filtered to obtain a beer of an original gravity of wort of 9 °P.

EXAMPLE 8

Yeast is added to the high-gravity hopped wort of 15 °P obtained in Example 5, and a primary fermentation at 14° C. for 8 days and a secondary fermentation for 1 month are carried out with the wort. The resulting material is diluted with water saturated with carbon dioxide gas thereby to obtain a dilute fermenting wort of an original gravity of wort of 8 °P. This wort was kept for 2 days in an aging tank and thereafter filtered into a beer.

EXAMPLE 9

With the use of 6,100 g. of malt, 1,200 g. of starch and 32 lit. of water in the conventional process, 27 lit. of a high-gravity hopped wort of 17 °P is obtained. Yeast is added to this wort, which is then subjected to primary and secondary fermentation similarly as in the preceding examples. The resulting material is diluted with water saturated with carbon dioxide to an original gravity of wort of 9 °P and, after being kept for 2 days, is filtered.

The analytical data of the beers of Examples 1 through 9 are indicated in the following table.

| Analysis | Beer (Example): | | | | | | | | |
|---|---|---|---|---|---|---|---|---|---|
| | 1* | 2* | 3* | 4* | 5** | 6** | 7** | 8* | 9* |
| Original gravity of wort (°P.) | 8.9 | 7.1 | 7.5 | 7.2 | 7.9 | 7.1 | 9.0 | 8.1 | 8.9 |
| Apparent extract (%) | 1.2 | 0.4 | 0.6 | 0.6 | 1.2 | 1.1 | 1.5 | 1.1 | 1.2 |
| Real extract (%) | 2.7 | 1.6 | 2.0 | 21.8 | 2.4 | 2.2 | 2.9 | 2.5 | 2.7 |
| Alcohol (W/W %) | 3.2 | 2.8 | 2.8 | 2.7 | 2.8 | 2.4 | 3.1 | 2.8 | 3.2 |
| Alcohol (V/V %) | 4.0 | 3.5 | 3.6 | 3.5 | 3.5 | 3.1 | 4.0 | 3.6 | 4.0 |
| Apparent attenuation (%) | 87 | 95 | 92 | 92 | 85 | 84 | 83 | 86 | 86 |
| Real attenuation (%) | 70 | 77 | 74 | 75 | 70 | 69 | 68 | 69 | 70 |
| Total nitrogen (mg/100g) | 40 | 47 | 46 | 57 | 55 | 36 | 42 | 53 | 42 |
| Ethyl acetate (ppm) | 12 | 9 | 17 | 11 | 17 | 21 | 25 | 21 | 31 |
| Isoamyl acetate (ppm) | 0.7 | 0.4 | 0.8 | 0.4 | 1.3 | 2.2 | 2.9 | 2.3 | 3.0 |
| Calorific value (Kcal/100 ml) | 34 | 27 | 28 | 27 | 30 | 26 | 34 | 30 | 34 |
| Taste test*** | | | | | | | | | |
| Malty (0 to 3) | 0.7 | 0.3 | 0.5 | 1.0 | 0.8 | 0.7 | 0.8 | 0.8 | 0.9 |
| Estery (0 to 3) | 0.7 | 0.2 | 0.5 | 0.5 | 1.0 | 1.4 | 2.0 | 1.8 | 2.0 |

-continued

|  | Beer (Example): | | | | | | | | |
|---|---|---|---|---|---|---|---|---|---|
|  | 1* | 2* | 3* | 4* | 5** | 6** | 7** | 8* | 9* |
| Pleasant estery (−3 to 3) | −0.2 | −0.1 | −0.3 | −0.1 | 1.0 | 1.8 | 1.6 | −0.1 | −0.3 |
| Smooth (−3 to 3) | −1.1 | −0.6 | −0.6 | −1.3 | 0.5 | 0.4 | 0.9 | 0.3 | 0.2 |
| Body (−3 to 3) | −0.8 | −0.6 | −0.9 | −0.6 | −0.9 | −1.0 | −0.3 | −0.6 | −0.4 |
| Fresh (−3 to 3) | −0.7 | −0.2 | −0.1 | −1.4 | 1.5 | 1.5 | 1.2 | 0.5 | 0.3 |
| Overall evaluation (−3 to 3) | −1.3 | −0.8 | −1.0 | −2.3 | 0.8 | 1.0 | 1.3 | −0.4 | −0.5 |

*Reference example
**Example of practice of the present invention
***Taste tests carried out by 10 experience and skilled panelists.
Each panelist made evaluations on each sample on the basis of four ratings in a range of 0 through 3 or seven ratings in a range of −3 through 3. The ratings of all panelists were totaled and averaged.

0 not perceptible           −3 very unpleasant
 1 slightly perceptible      −2 moderately unpleasant
 2 moderately perceptible    −1 slightly unpleasant
 3 strongly perceptible       0 neither unpleasant nor pleasing
                              1 slightly pleasing
                              2 moderately pleasing
                              3 very pleasing The calorific values were calculated according to an empirical formula of Stewart et al.

What we claim is:

1. A beer brewing process which comprises mixing one part by volume of a high-gravity liquor comprising a fermenting wort of an original gravity of 14 to 21 degrees Plato which has passed through the high kraeusen period and two to five parts by volume of a low-gravity liquor comprising a fermenting wort or wort of an original gravity of 3 to 6 degrees Plato and subjecting the resulting mixture to fermentation thereby to obtain a beer of an original gravity of 6 to 9 degrees Plato, the wort to provide the high-gravity liquor and the low-gravity liquor being obtained from a mash comprising a mixture of malt and 0 to 50 percent of the weight of the malt of an adjunct on the basis of the two liquors after mixing thereof, and the total nitrogen content of the low-gravity liquor being at least 30 mg./100 g.

2. A beer brewing process according to claim 1 in which the wort to provide the low-gravity liquor is a dilution of the wort to provide the high-gravity liquor.

3. A beer brewing process according to claim 2 in which said dilution comprises the washings of the filter cake of the mash after recovery as a filtrate of the wort to provide the high-gravity liquor.

4. A beer brewing process according to claim 1 in which both the high-gravity liquor and the low-gravity liquor are those to which hops have been added.

5. A beer brewing process according to claim 1 in which the low-gravity liquor is a fermenting wort which has passed through the high kraeusen period.

6. A beer brewing process according to claim 1 in which the high-gravity liquor and the low-gravity liquor have been prepared from respectively different mashes.

7. A beer brewing process as claimed in claim 1, 2, 3, 4, 5 or 6, in which the high-gravity liquor which has passed through the high kraeusen period has an apparent gravity which is about 40 to 50 percent of the original gravity of wort.

* * * * *